United States Patent
Douglass et al.

(10) Patent No.: US 7,539,848 B1
(45) Date of Patent: May 26, 2009

(54) CONFIGURABLE LOGIC FABRIC INCLUDING TWO FIXED LOGIC PROCESSORS WITH INDIVIDUAL INTERFACE TO RECEIVE AVAILABILITY SIGNAL FROM CUSTOM OPERATION CODE CONFIGURED PROCESSOR

(75) Inventors: Stephen M. Douglass, Saratoga, CA (US); Ahmad R. Ansari, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 39 days.

(21) Appl. No.: 11/242,177

(22) Filed: Sep. 30, 2005

Related U.S. Application Data

(62) Division of application No. 11/059,748, filed on Feb. 17, 2005, now Pat. No. 7,194,600, which is a division of application No. 10/001,871, filed on Nov. 19, 2001, now Pat. No. 6,886,092.

(51) Int. Cl.
   *G06F 15/16* (2006.01)
(52) U.S. Cl. .......................................... 712/37; 712/36
(58) Field of Classification Search ........................ None
   See application file for complete search history.

(56) References Cited

U.S. PATENT DOCUMENTS

| | | |
|---|---|---|
| 4,758,985 A | 7/1988 | Carter |
| 4,855,669 A | 8/1989 | Mahoney |
| 5,072,418 A | 12/1991 | Boutaud et al. |
| 5,142,625 A | 8/1992 | Nakai |
| RE34,363 E | 8/1993 | Freeman |
| 5,274,570 A | 12/1993 | Izumi et al. |
| 5,311,114 A | 5/1994 | Sambamurthy et al. |
| 5,339,262 A | 8/1994 | Rostoker et al. |
| 5,347,181 A | 9/1994 | Ashby et al. |
| 5,361,373 A | 11/1994 | Gilson |

(Continued)

FOREIGN PATENT DOCUMENTS

EP    0315275 A2   10/1989

(Continued)

OTHER PUBLICATIONS

U.S. Appl. No. 09/968,446, filed Nov. 1, 1994, Gilson.

(Continued)

*Primary Examiner*—Kenneth S Kim
(74) *Attorney, Agent, or Firm*—Justin Liu; John J. King

(57) ABSTRACT

A system is disclosed comprising a logic circuit in an integrated circuit device, wherein the logic circuit comprises a logic fabric that includes a plurality of configurable logic blocks, switching blocks, and input/output blocks, wherein the logic fabric is configured according to configuration data provided to the integrated circuit device from an external memory and at least a portion of the logic fabric is configured as a configured processor to perform a first fixed logic function according to the configuration data. A fixed logic processor, a first auxiliary processing interface, a second fixed logic processor, a second auxiliary processing interface enable communication with the configured processor, wherein the configured processor remains configured to enable both the fixed logic processor and the second fixed logic processor to access the configured processor to perform the fixed logic function.

5 Claims, 7 Drawing Sheets

U.S. PATENT DOCUMENTS

| | | | |
|---|---|---|---|
| 5,426,744 A * | 6/1995 | Sawase et al. ............... | 712/228 |
| 5,473,267 A | 12/1995 | Stansfield | |
| 5,500,943 A | 3/1996 | Ho et al. | |
| 5,504,738 A | 4/1996 | Sambamurthy et al. | |
| 5,537,601 A | 7/1996 | Kimura et al. | |
| 5,543,640 A | 8/1996 | Sutherland et al. | |
| 5,550,782 A | 8/1996 | Cliff et al. | |
| 5,552,722 A | 9/1996 | Kean | |
| 5,574,930 A | 11/1996 | Halverson, Jr. et al. | |
| 5,574,942 A | 11/1996 | Colwell et al. | |
| 5,581,745 A | 12/1996 | Muraoka | |
| 5,600,845 A | 2/1997 | Gilson | |
| 5,652,904 A | 7/1997 | Trimberger | |
| 5,671,355 A | 9/1997 | Collins | |
| 5,705,938 A | 1/1998 | Kean | |
| 5,732,250 A | 3/1998 | Bates et al. | |
| 5,737,631 A | 4/1998 | Trimberger | |
| 5,740,404 A | 4/1998 | Baji | |
| 5,742,179 A | 4/1998 | Sasaki | |
| 5,742,180 A | 4/1998 | DeHon et al. | |
| 5,748,979 A | 5/1998 | Trimberger | |
| 5,752,035 A | 5/1998 | Trimberger | |
| 5,760,607 A | 6/1998 | Leeds et al. | |
| 5,809,517 A | 9/1998 | Shimura | |
| 5,835,405 A | 11/1998 | Tsui et al. | |
| 5,874,834 A | 2/1999 | New | |
| 5,889,788 A | 3/1999 | Pressly et al. | |
| 5,892,961 A | 4/1999 | Trimberger | |
| 5,914,902 A | 6/1999 | Lawrence et al. | |
| 5,933,023 A | 8/1999 | Young | |
| 5,960,209 A * | 9/1999 | Blount et al. ............... | 712/1 |
| 5,968,161 A | 10/1999 | Southgate | |
| 5,970,254 A | 10/1999 | Cooke et al. | |
| 6,011,407 A | 1/2000 | New | |
| 6,020,755 A | 2/2000 | Andrews et al. | |
| 6,026,481 A | 2/2000 | New et al. | |
| 6,096,091 A | 8/2000 | Harmann | |
| 6,154,051 A | 11/2000 | Nguyen et al. | |
| 6,163,166 A | 12/2000 | Bielby et al. | |
| 6,172,990 B1 | 1/2001 | Deb et al. | |
| 6,178,541 B1 | 1/2001 | Joly et al. | |
| 6,181,163 B1 | 1/2001 | Agrawal et al. | |
| 6,211,697 B1 | 4/2001 | Lien et al. | |
| 6,242,945 B1 | 6/2001 | New | |
| 6,272,451 B1 | 8/2001 | Mason et al. | |
| 6,279,045 B1 | 8/2001 | Muthujumaraswathy et al. | |
| 6,282,627 B1 | 8/2001 | Wong et al. | |
| 6,301,696 B1 | 10/2001 | Lien et al. | |
| 6,314,551 B1 * | 11/2001 | Borland ............... | 716/17 |
| 6,327,647 B1 * | 12/2001 | Moyer et al. ............... | 712/34 |
| 6,343,207 B1 | 1/2002 | Hessel et al. | |
| 6,353,331 B1 | 3/2002 | Shimanek | |
| 6,356,987 B1 | 3/2002 | Aulas | |
| 6,389,558 B1 | 5/2002 | Herrmann et al. | |
| 6,434,689 B2 * | 8/2002 | Fleck et al. ............... | 712/34 |
| 6,434,735 B1 | 8/2002 | Watkins | |
| 6,460,172 B1 | 10/2002 | Insenser Farre et al. | |
| 6,467,009 B1 | 10/2002 | Windgarden et al. | |
| 6,507,942 B1 | 1/2003 | Calderone et al. | |
| 6,510,548 B1 | 1/2003 | Squires | |
| 6,518,787 B1 | 2/2003 | Allegrucci et al. | |
| 6,519,753 B1 | 2/2003 | Ang | |
| 6,522,167 B1 | 2/2003 | Ansari et al. | |
| 6,532,572 B1 | 3/2003 | Tetelbaum | |
| 6,539,508 B1 | 3/2003 | Patrie et al. | |
| 6,541,991 B1 | 4/2003 | Horncheck | |
| 6,584,525 B1 | 6/2003 | Klingman | |
| 6,587,995 B1 | 7/2003 | Duboc et al. | |
| 6,588,006 B1 | 7/2003 | Watkins | |
| 6,601,227 B1 | 7/2003 | Trimberger | |
| 6,604,228 B1 | 8/2003 | Patel et al. | |
| 6,611,951 B1 | 8/2003 | Tetelbaum et al. | |
| 6,662,285 B1 | 12/2003 | Douglass et al. | |
| 6,704,816 B1 | 3/2004 | Burke | |
| 6,798,239 B2 | 9/2004 | Douglass et al. | |
| 6,886,092 B1 | 4/2005 | Douglass et al. | |
| 6,983,405 B1 | 1/2006 | Herron et al. | |
| 6,996,758 B1 | 2/2006 | Herron et al. | |
| 7,076,595 B1 | 7/2006 | Dao et al. | |
| 7,194,600 B2 | 3/2007 | Douglass et al. | |
| 2001/0049813 A1 | 12/2001 | Chan et al. | |

FOREIGN PATENT DOCUMENTS

| | | |
|---|---|---|
| EP | 0 905 906 A2 | 3/1999 |
| EP | 1 235 351 A1 | 8/2002 |
| WO | WO 93 25968 A1 | 12/1993 |

OTHER PUBLICATIONS

Sayfe Kiaei et al., "VLSI Design of Dynamically Reconfigurable Array Processor-DRAP," IEEE, Feb. 1989, pp. 2484-2488, V3.6, IEEE, 3 Park Avenue, 17th Floor, New York, NY 10016-5997.

Vason P. Srini, "Field Programmable Gate Array (FPGA) Implementation of Digital Systems: An Alternative to ASIC," IEEE, May 1991, pp. 309-314, IEEE, 3 Park Avenue, 17th Floor, New York, NY 10016-5997.

G. Maki et al., "A Reconfigurable Data Path Processor," IEEE, Aug, 1991, pp. 18-4.1 to 18-4.4, IEEE, 3 Park Avenue, 17th Floor, New York, NY 10016-5997.

Jacob Davidson, "FPGA Implementation of Reconfigurable Microprocessor," IEEE, Mar. 1993, pp. 3.2.1-3.2.4, IEEE, 3 Park Avenue, 17th Floor, New York, NY 10016-5997.

Christian Iseli et al., "Beyond Superscaler Using FPGA's," IEEE, Apr. 1993, pp. 486-490, IEEE, 3 Park Avenue, 17th Floor, New York, NY 10016-5997.

P.C. French et al., "A Self-Reconfiguring Processor,"; IEEE, Jul. 1993, pp. 50-59, IEEE, 3 Park Avenue, 17th Floor, New York, NY 10016-5997.

Christian Iseli et al., "Spyder: A Reconfigurable VLIW Processor Using FPGA's," IEEE, Jul. 1993, pp. 17-24, IEEE, 3 Park Avenue, 17th Floor, New York, NY 10016-5997.

Michael. J. Wirthlin et al., "The Nano Processor: A Low Resource Reconfigurable Processor," IEEE, Feb. 1994, pp. 23-30, IEEE, 3 Park Avenue, 17th Floor, New York, NY 10016-5997.

William S. Carter, "The Future of Programmable Logic and Its Impact on Digital System Design," Apr. 1994, IEEE, pp. 10-16, IEEE, 3 Park Avenue, 17th Floor, New York, NY 10016-5997.

Andre' Dehon, "DPGA-Coupled Microprocessors: Commodity ICs for the Early 21st Century," IEEE, Feb. 1994, pp. 31-39, IEEE, 3 Park Avenue, 17th Floor, New York, NY 10016-5997.

Osama T. Albaharna, "Area & Time Limitations of FPGA-Based Virtual Hardware," IEEE, Apr. 1994, pp. 184-189, IEEE, 3 Park Avenue, 17th Floor, New York, NY 10016-5997.

Xilinx, Inc., "The Programmable Logic Data Book," 1994, Revised 1995, Xilinx, Inc., 2100 Logic Drive, San Jose, CA. 95124.

Xilinx, Inc., "The Programmable Logic Data Book," 1994, Revised 1995, pp. 2-109 to 2-117, Xilinx, Inc., 2100 Logic Drive, San Jose, CA. 95124.

Xilinx, Inc., "The Programmable Logic Data Book," 1994, Revised 1995, pp. 2-9 to 2-18; 2-187 to 2-199, Xilinx, Inc., 2100 Logic Drive, San Jose, CA. 95124.

Xilinx, Inc., "The Programmable Logic Data Book," 1994, Revised 1995, pp. 2-107 to 2-108, Xilinx, Inc., 2100 Logic Drive, San Jose, CA. 95124.

Christian Iseli et al., "AC++ Compiler for FPGA Custom Execution Units Synthesis," 1995, pp. 173-179, IEEE, 3 Park Avenue, 17th Floor, New York, NY 10016-5997.

*International Business Machines*, "PowerPC 405 Embedded Processor Core User Manual," 1996, 5th Ed., pp. 1-1 to X-16, International Business Machines, 1580 Rout 52, Bldg. 504, Hopewell Junction, NY 12533-6531.

Yamin Li et al., "Aizup-A Pipelined Processor Design & Implementation on Xilinx FPGA Chip," IEEE, Sep. 1996, pp. 98-106, 98-106, IEEE, 3 Park Avenue, 17th Floor, New York, NY 10016-5997.

Ralph D. Wittig et al., Onechip: An FPGA Processor With Reconfigurable Logic, Apr. 17, 1996, pp. 126-135, IEEE, 3 Park Avenue, 17th Floor, New York, NY 10016-5997.

Xilinx, Inc., "The Programmable Logic Data Book," Jan. 27, 1999, Ch. 3, pp. 3-1 to 3-50, Xilinx, Inc., 2100 Logic Drive, San Jose, CA 95124.

William B. Andrew et al., "A Field Programmable System Chip Which Combines FPGA & ASIC Circuitry," IEEE, May 16, 1999, pp. 183-186, IEEE, 3 Park Avenue, 17th Floor, New York, NY 10016-5997.

Xilinx, Inc., "The Programmable Logic Data Book," 2000, Ch. 3 pp. 3-1 to 3-117, Xilinx, Inc., 2100 Logic Drive, San Jose, CA 95124.

Xilinx, Inc., "The Programmable Logic Data Book," 2000, Ch 3, pp. 3-7 to 3-17; 3-76 to 3-87, Xilinx, Inc., 2100 Logic Drive, San Jose, CA. 95124.

*International Business Machines*, "Processor Local Bus" Architecture Specifications, 32-Bit Implementation, Apr. 2000, First Edition, V2.9, pp. 1-76, IBM Corporation, Department H83A, P.O. Box 12195, Research Triangle Park, NC 27709.

Xilinx, Inc., Virtex II Platform FPGA Handbook, Dec. 6, 2000, v1.1, pp. 33-75, Xilinx, Inc., 2100 Logic Drive, San Jose, CA. 95124.

Cary D. Snyder and Max Baron; "Xilinx's A-to-Z System Platform"; Cahners Microprocessor; The Insider's Guide to Microprocessor Hardware; Microdesign Resources; Feb. 26, 2001; pp. 1-5.

U.S. Appl. No. 09/858,732, filed May 15, 2001, David P. Schultz, Xilinx, Inc. 2100 Logie Drive, San Jose, CA.

* cited by examiner

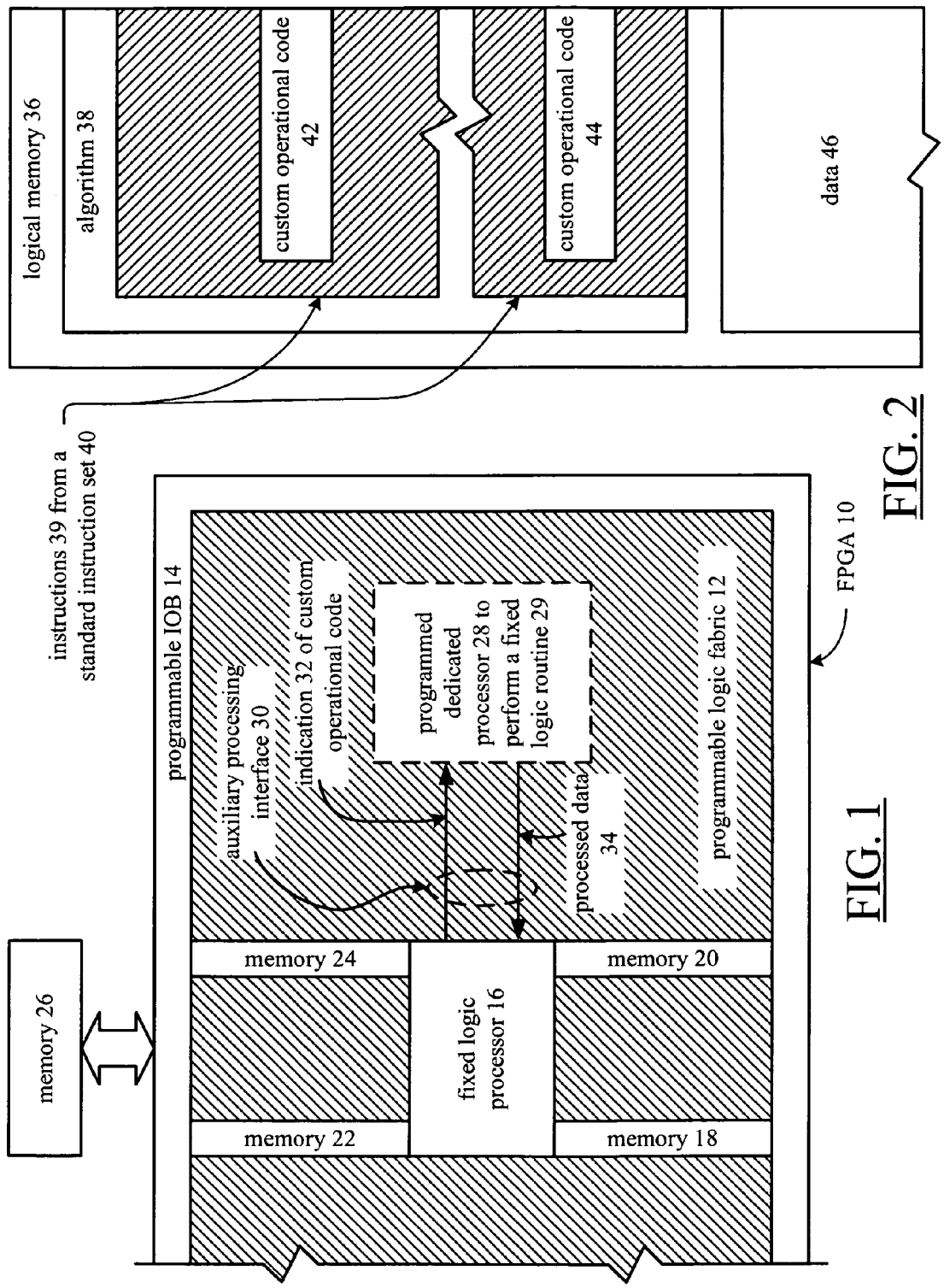

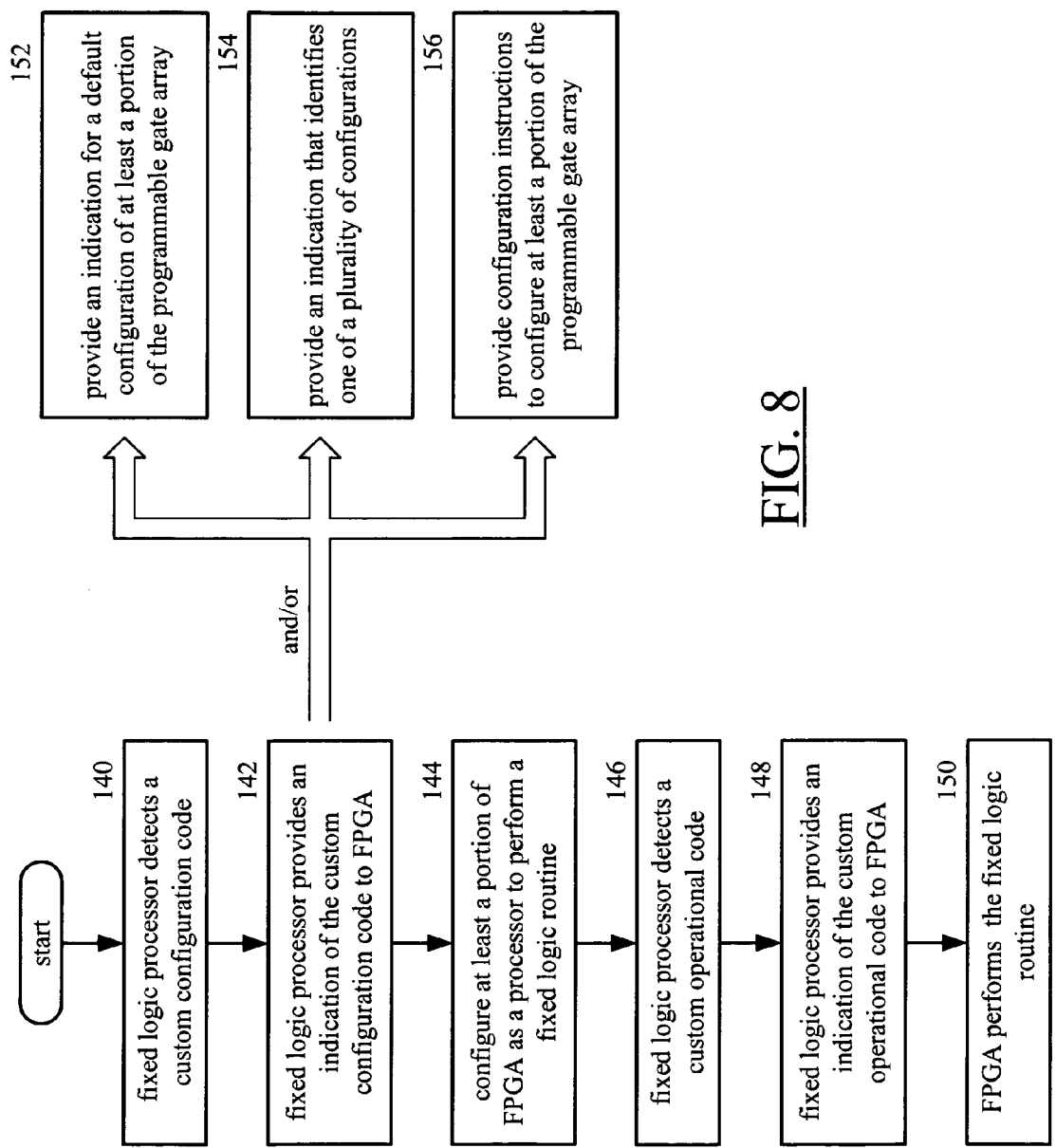

CONFIGURABLE LOGIC FABRIC INCLUDING TWO FIXED LOGIC PROCESSORS WITH INDIVIDUAL INTERFACE TO RECEIVE AVAILABILITY SIGNAL FROM CUSTOM OPERATION CODE CONFIGURED PROCESSOR

TECHNICAL FIELD OF THE INVENTION

This invention relates generally to programmable gate arrays and in particular to an embedded fixed logic circuit utilizing at least a portion of a programmable gate array to perform a fixed logic function.

BACKGROUND OF THE INVENTION

Programmable devices are a class of general-purpose integrated circuit that can be configured to accomplish a wide variety of applications. Such programmable devices have two basic versions: mask programmable devices, which are programmed only by a manufacturer, and field programmable devices, which are programmable by the end user. In addition, programmable devices can be further categorized as programmable memory devices and programmable logic devices. Programmable memory devices include programmable read-only memory (PROM), erasable programmable read-only memory (EPROM), and electronically erasable programmable read-only memory (EEPROM). Programmable logic devices include programmable logic array (PLA) devices, programmable array logic (PAL) devices, erasable programmable logic devices (EPLD), and programmable gate arrays (PGA).

Field programmable gate arrays (FPGA) have become very popular for telecommunication applications, Internet applications, switching applications, routing applications, et cetera. FPGAs typically include programmable logic fabric and a plurality of input/output blocks. As implemented on an integrated circuit, the input/output blocks are fabricated on the perimeter of the die surrounding the programmable logic fabric. The programmable logic fabric includes a plurality of configurable logic blocks (CLB) and a plurality of interconnections. Each of the configurable logic blocks can be programmed to perform simple logic functions and/or simple Boolean equations. By programming the interconnections, the programmed logic functions of individual configurable logic blocks can be coupled together to implement more complex logic functions and/or Boolean equations.

Because of its programming diversity, field programmable gate arrays offer end users the benefits of custom CMOS VLSI integrated circuits while avoiding the initial cost, design time delay, and inherent risks of application specific integrated circuits (ASIC). While FPGAs have these advantages, there are some disadvantages. For instance, an FPGA-based design to perform a similar function as implemented in an ASIC requires approximately 25 to 50 times more die area than the ASIC. As such, the manufacturing expense of an FPGA is greater than that of an ASIC. In addition, an FPGA requires significantly more printed circuit board space and consumes more power than an equally functional ASIC.

To mitigate some of the disadvantages of FPGAs with respect to ASICs, some FPGA manufacturers are including ASIC like functions on the same substrate as the programmable logic fabric. For example, FPGAs are now commercially available that include Random Access Memory (RAM) blocks and/or multipliers in the programmable logic fabric. As such, the programmable logic fabric does not have to be programmed to perform RAM functions and/or multiplier functions, when such functions are needed. Thus, for these functions, significantly less die area is needed within the FPGA.

While including such fixed logic functions in the programmable logic fabric offers end users greater design flexibility with less die consumption, end users are demanding greater performance and flexibility from FPGAs. In particular, end users would like to see more fixed logic functionality (i.e., ASIC like functionality) embedded within the programmable logic fabric of FPGAs, while retaining the versatility of traditional FPGAs.

Therefore, a need exists for a programmable gate array that includes embedded fixed logic circuits that uses at least a portion of the FPGA to perform a fixed logic function.

BRIEF DESCRIPTION OF THE DRAWINGS

FIG. 1 illustrates a schematic block diagram of a field programmable gate array in accordance with the present invention;

FIG. 2 illustrates a graphical diagram of a logical memory of the FPGA of FIG. 1;

FIG. 8 illustrates a logic flow diagram of an alternate method for processing data within a programmable gate array in accordance with the present invention.

DETAILED DISCUSSION OF A PREFERRED EMBODIMENT

Figure 3:
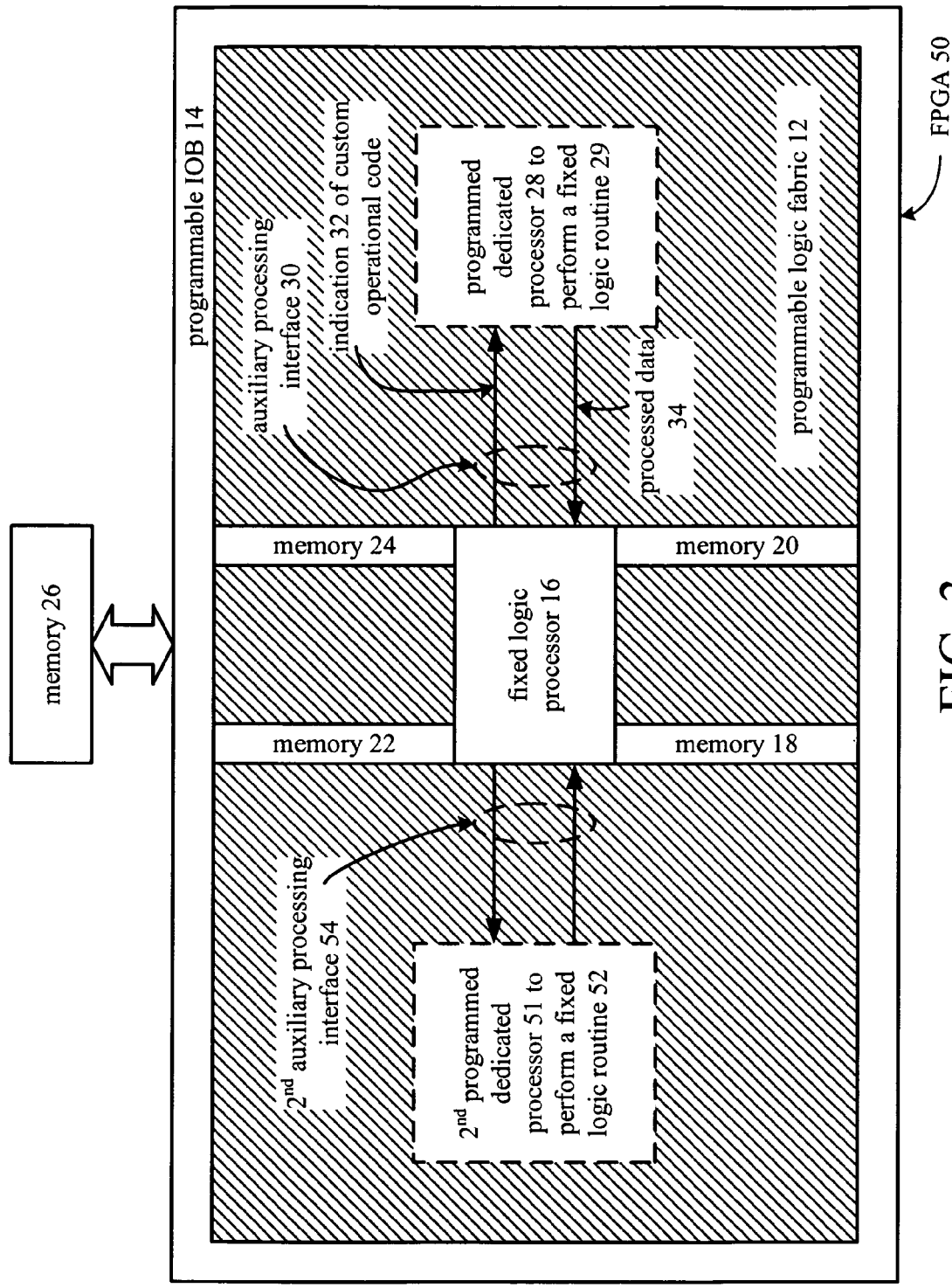
FIG. 3 illustrates a schematic block diagram of an alternate field programmable gate array in accordance with the present invention.

Generally, the present invention provides a method and apparatus for processing data within a programmable gate array. Such a method and apparatus includes processing that begins when a fixed logic processor that is embedded within the programmable gate array detects a custom operation code. For example, the fixed logic processor may be an embedded microprocessor that is performing an algorithm that includes instructions from a standard instruction set when it detects the custom operational code within algorithm. Such a custom operational code may be inserted in the algorithm by the end user of the programmable gate array, where the custom operational code indicates that a fixed logic routine is to be performed by at least a portion of the programmable gate array. The processing continues when the fixed logic processor provides an indication of the custom operational code to the programmable gate array. In essence, the fixed logic processor is interpreting the custom operational code and instructing the programmable gate array to perform a fixed logic function. The processing continues by having at least a portion of the programmable gate array, which is configured as a dedicated processor, performing a fixed logic routine upon receiving the indication from the fixed logic processor. With such a method and apparatus, programmable gate arrays offer enhanced programming options and flexibility for end users by efficiently utilizing embedded fixed logic processors in combination with at least a portion of the programmable gate array.

The present invention can be more fully described with reference to FIGS. 1 through 8. FIG. 1 illustrates a schematic block diagram of a field programmable gate array 10 that includes programmable logic fabric 12, programmable input/output blocks 14, a fixed logic processor 16, memory blocks 18, 20, 22 and 24, an auxiliary processing interface 30 and a portion of the programmable logic fabric 12 that is programmed to function as a dedicated processor 28 to perform a fixed logic routine 29. The programmable logic fabric 12 includes a plurality of configurable logic blocks (CLB) and a plurality of interconnections. In addition, the programmable logic fabric may include multipliers to perform multiplication related functions. The construction and operation of the programmable logic fabric 12 may be of the type found in FPGAs commercially available from Xilinx, Inc., such as the XZ4000E family of field programmable gate arrays and/or the Virtex-II FPGAs.

As is further illustrated, the FPGA 10 may be coupled to an external memory device 26, such as a Random Access Memory (RAM) dynamic RAM (DRAM), static RAM (SRAM), flash memory, and/or any other type of devices that stores digital information. The external memory device 26 is operably coupled to the programmable IOBs 14, such that the fixed logic processor 16 and/or the programmable logic fabric 12 may access the memory device 26.

As one of average skill in the art will appreciate, the field programmable gate array 10 may be any type of mask and/or field programmable gate array, mask and/or field programmable array logic device, and/or mask and/or field programmable logic device. As one of average skill in the art will further appreciate, the field programmable gate arrays shown in each of the Figures of the present invention may similarly be any type of mask and/or field programmable gate arrays, mask and/or field programmable array logic devices, and/or mask and/or field programmable logic devices.

The fixed logic processor 16 may be a microprocessor, microcontroller, digital signal processor, and/or any device that manipulates signals (analog and/or digital) based on operational instructions. The fixed logic processor 16, regardless of its particular construction, includes an auxiliary processing interface 30 for interfacing with peripheral devices, co-processors, et cetera. If the fixed logic processor 16 is a microprocessor or digital signal processor, it is constructed to perform in accordance with a particular architectural type, such as X.86, RISC, MIPS, et cetera. Each of these architectural types has a corresponding instruction set from which algorithms are composed. Accordingly, as the fixed logic processor 16 is executing one or more applications, it is performing instructions of the corresponding instruction set. Such instructions may be stored in the block memory 18 through 24 and/or in the external memory 26.

Referring simultaneously to FIGS. 1 and 2, FIG. 2 illustrates a graphical representation of a logical memory 36 for the FPGA 10. The logical memory includes the memory blocks 18 through 24 and/or the external memory 26. From a logical standpoint, memory 26 and memory block 18 through 24 appear to the FPGA 10 and the embedded fixed logic processor 16 as a single memory device. To efficiently process data transfers between logical memory 36, the programmable logic fabric 12, and the fixed logic processor 16, a memory controller may be required. Such a memory controller may be included as part of the fixed logic processor 16 or included as a separate fixed logic device embedded within the programmable logic fabric. In addition to the instructions and data being processed by the fixed logic processor 16, or the custom processor 28, the memory device 26 may contain the configuration data that is used to configure the logic fabric and the custom processor 28. This data is either used prior to the fixed logic processor operation or used in the middle of its operation for a partial reconfiguration.

The logical memory 36 stores algorithms 38, which are to be executed by the fixed logic processor 16, and data 46. The data 46 may be intermediate processed data (i.e., data that the fixed logic processor is currently working on), operands to be processed, and/or resulting data (i.e., data that the fixed logic processor has finished processing). In addition, the programmable logic fabric 12 and/or by the dedicated portion of the programmable logic fabric 28 may access and/or process the data 46 stored in the logical memory 36.

In operation, the fixed logic processor 16 will execute algorithm 38 by performing the instructions 39 of the algorithm. The instructions are from the standard instruction set 40, which corresponds to the particular architectural type of the fixed logic processor 16. The fixed logic processor 16 will continue to execute the instructions of the algorithm 38 until it reaches the custom operational code 42. The custom operational code 42 may be a set of user-generated micro-code triggered by the execution of the standard instruction set 40 and/or user-generated non-standard instructions buried within the standard instruction set 40.

Accordingly, the programmer of the FPGA 10 may create his or her own custom operational codes, which, when encountered within an algorithm, causes the fixed logic processor 16 to evoke the dedicated processor 28 of the programmable logic fabric 12. As one of average skill in the art will appreciate, the custom operational code 42 may include a simple instruction evoking the dedicated processor 28 to perform a particular function on the data provided along with the custom operational code, instructions on where to fetch the data, and/or other types of instructions as to where to retrieve the data and/or where to send the resultant data.

When the fixed logic processor 16 encounters the custom operational code 42, it provides an indication 32 of the custom operational code to the dedicated processor 28. The dedicated processor 28 performs a fixed logic routine 29 and produces processed data 34. The processed data 34 is provided back to the fixed logic processor 16. As one of average skill in the art will further appreciate, the custom operational code 42 may be a true co-processing code in that the fixed logic processor 16 continues performing instructions 39 of algorithm 38 while the dedicated processor 28 is performing the fixed logic routine 29. Alternatively, the custom operation of code 42 may function as an interrupt wherein the fixed logic processor 16 pauses processing of the algorithm 38 until the processed data 34 is received from the dedicated processor 28. In addition, the interrupt processing may cause the fixed logic processor 16 to jump into different locations within algorithm 38 depending on the processed data 34.

The dedicated processor 28 of the programmable logic fabric 12 is programmed to perform a fixed logic routine 29, which will be primarily dependent on the use of the FPGA 10. For example, if the FPGA 10 is used in a telecommunication application, wherein the fixed logic processor 16 is processing telecommunication data, the fixed logic routine 29 may be a finite impulse response filter, an infinite impulse response filter, equalization processing, forward error correction, et cetera. In general, the fixed logic routine 29 may be most beneficial if it is a relatively high MIPS (millions of instructions per second) function that requires minimal memory access. These types of functions, allow the processor 16 to free-up its processing resources for more memory intensive functions. Otherwise, the performance of the dedicated processor can be greatly enhanced if it has its own local memory or dedicated paths to the external memory.

As one of average skill in the art will appreciate, the fixed logic processor 16 may communicate with the dedicated processor 28 via an interface other than an auxiliary processing interface 30. For example, if the fixed logic processor 16 does not include an auxiliary processing interface 30, it may utilize its primary buses to interface with the dedicated processor 28.

FIG. 3 illustrates a schematic block diagram of an alternate field programmable gate array 50. The FPGA 50 includes the fixed logic processor 16, the dedicated processor 28, the memory blocks 18 through 24, the programmable logic fabric 12, the programmable input/output blocks 14, the auxiliary processing interface 30, a $2^{nd}$ auxiliary processing interface 54, and a $2^{nd}$ dedicated processor 51. In this embodiment, the programmable logic fabric 12 includes two sections that are dedicated to performing fixed logic routines 29 and 52 as co-processors 28 and 51 for the fixed logic processor 16.

Accordingly, the fixed logic processor 16, while performing the algorithm 38 of FIG. 2, when it encounters operational code 42, causes the $1^{st}$ dedicated processor 28 to perform the fixed logic routine 29. When the processor 16 encounters the $2^{nd}$ custom operational code 44, it may cause the dedicated processor 51 to perform a $2^{nd}$ fixed logic routine 52. The fixed logic processor 16 would provide an indication of the $2^{nd}$ custom operational code, via the $2^{nd}$ auxiliary processing interface 54 to the $2^{nd}$ dedicated processor 51. The resulting data would be provided via the $2^{nd}$ auxiliary processing interface 54 from the dedicated processor 51 to the fixed logic processor 16.

As one of average skill in the art will appreciate, the fixed logic processor 16 may use the same auxiliary processing interface to communicate with the two dedicated processing sections of the programmable logic fabric 12. As one of average skill in the art will further appreciate, if the fixed logic processor 16 does not include an auxiliary processing interface, it may utilize its primary buses to interface with the $1^{st}$ and/or $2^{nd}$ dedicated processor 28 and 51 of the programmable logic fabric 12.

Figure 4:
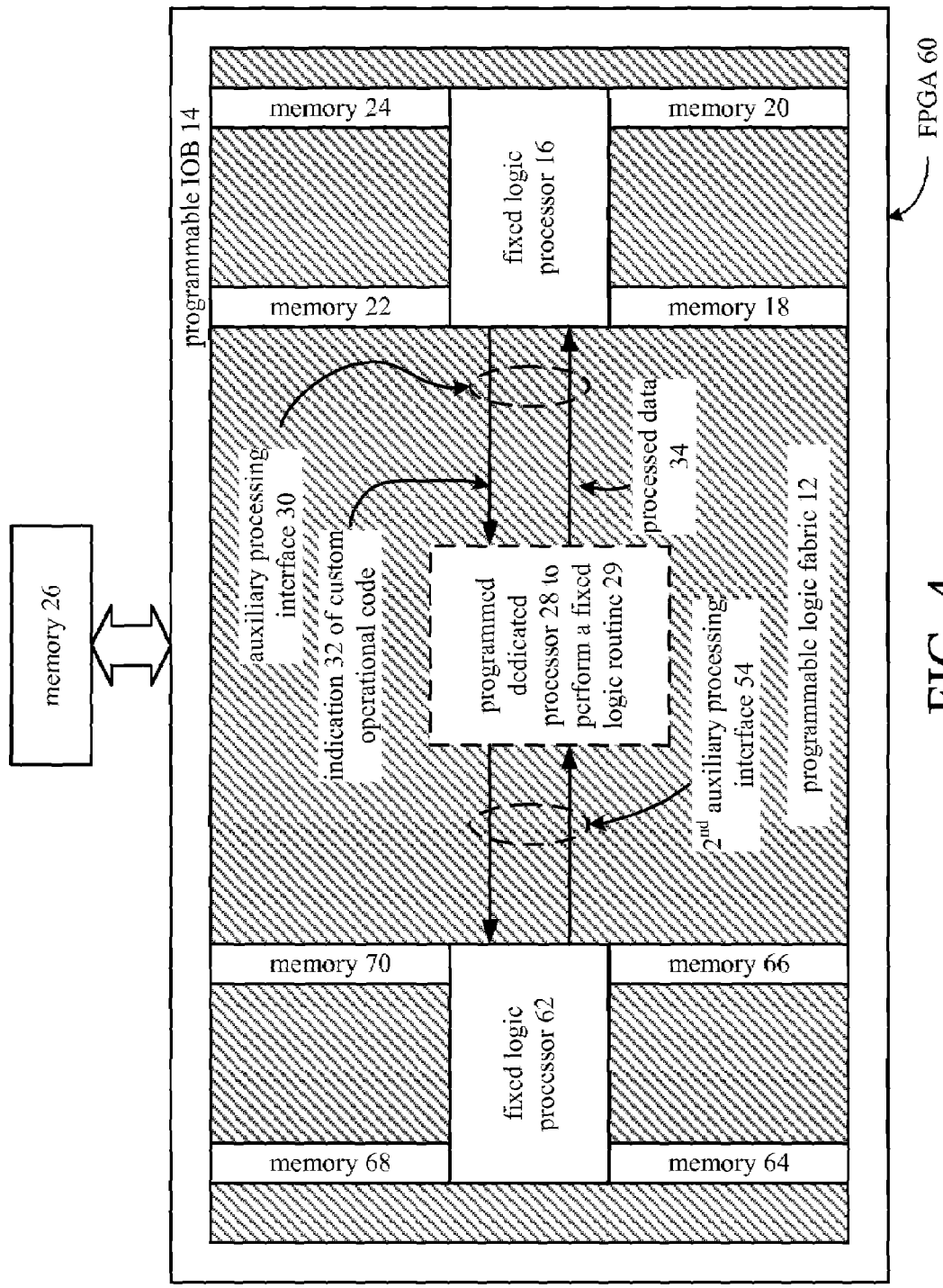
FIG. 4 illustrates a schematic block diagram of yet another field programmable gate array in accordance with the present invention.

FIG. 4 illustrates a schematic block diagram of another embodiment of a field programmable gate array 60. The FPGA 60 includes the $1^{st}$ logic processor 16, memory blocks 18 through 24, the programmable input/output blocks 14, the programmable logic fabric 12, the dedicated processor 28, a $2^{nd}$ fixed logic processor 62 and a $2^{nd}$ group of memory blocks 64, 66, 68 and 70. In this embodiment, each of the fixed logic processors 16 and 62 will perform its own algorithm but would include the same custom operational code. For example, referring to FIG. 2 and FIG. 4 simultaneously, fixed logic processor 16 will perform algorithm 38 while fixed logic processor 62 will perform an alternate algorithm, where each algorithm will include custom operational code 42. When each of the logic processors 16 and 62 encounters the custom operational code 42, the dedicated processor 28 is evoked to perform the fixed logic routine 29. In this embodiment, the fixed logic processors 16 and 62 would communicate to determine that the dedicated processor 28 is available before providing the indication of the custom operational code. It is also possible that a busy signal from the custom processor 28 signifies the availability of the custom processor 28 to a fixed processor 16 and/or 62.

Figure 5:
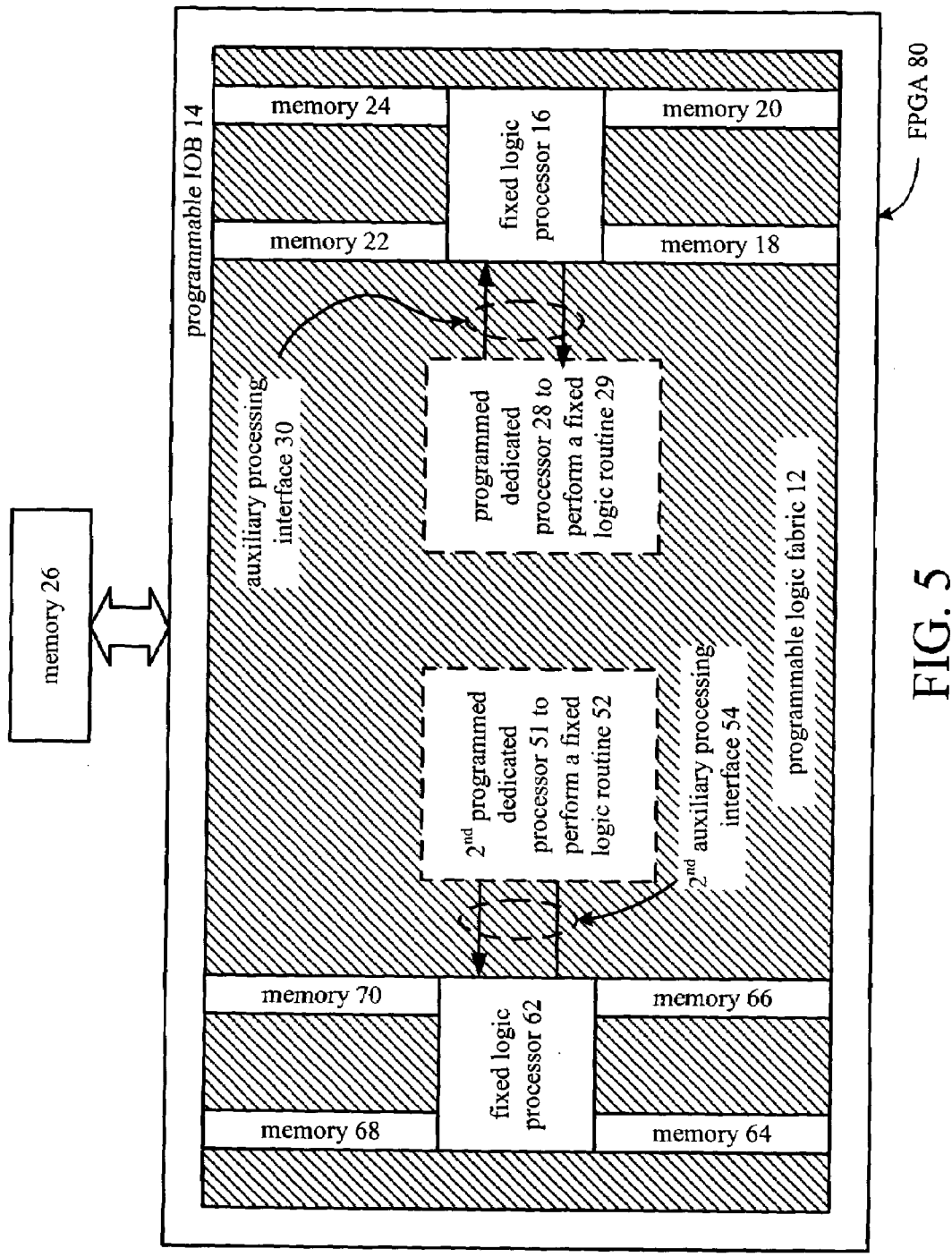
FIG. 5 illustrates a schematic block diagram of a further field programmable gate array in accordance with the present invention.

FIG. 5 illustrates yet another embodiment of a field programmable gate array 80. The FPGA 80 includes the programmable logic fabric 12, the programmable input/output blocks 14, the fixed logic processor 16, memory blocks 18 through 24, a $2^{nd}$ fixed logic processor 62, a $2^{nd}$ set of memory blocks 64 through 70, a programmed dedicated processor 28, and a $2^{nd}$ dedicated processor 51. In this illustration, each fixed logic processor 16 and 62 has a separate dedicated processor programmed within the programmable logic fabric 12. In this embodiment, each of the fixed logic processors 16 and 62 performs an algorithm similar to algorithm 38 shown in FIG. 2 to evoke their respective dedicated co-processors. Each utilizes their own auxiliary processing interface 30 and 54 to communicate with the programmed dedicated processor 28 and 51, respectively.

Figure 6:
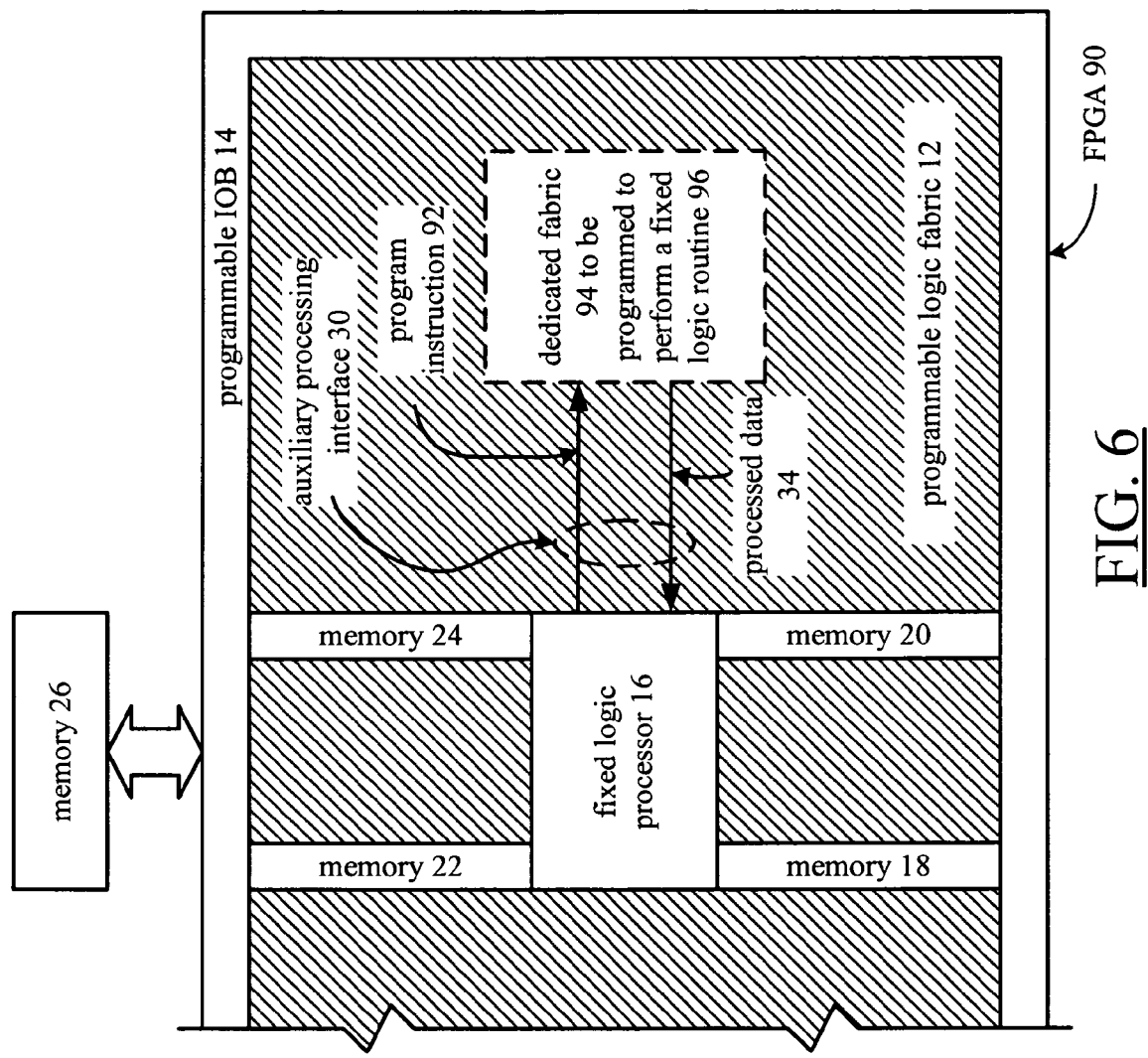
FIG. 6 illustrates a schematic block diagram of a still further embodiment of a field programmable gate array in accordance with the present invention.

FIG. 6 illustrates a schematic block diagram of a still further embodiment of a field programmable gate array 90. The FPGA 90 includes the programmable logic fabric 12, the programmable input/output blocks 14, the fixed logic processor 16, the memory blocks 18 through 24, the auxiliary processing interface 30 and also a dedicated fabric 94 that can be programmed to perform a fixed logic routine 96. In this embodiment, a portion of the programmable logic fabric 12 has been dedicated for performing particular functions for the fixed logic processor 16. However, the dedicated fabric 94 is not always configured to perform the same fixed logic routine as was the case for the embodiments in FIGS. 1, and 3 through 5. Accordingly, the fixed logic processor 16 may invoke a programming instruction 92 that causes the dedicated fabric 94 to be configured to perform a fixed logic routine 96. The recipient of this programming instruction may be a module that is in charge of configuring the dedicated area with the required logic. Various configuration data may be stored in the external memory 26 or a separate dedicated storage. Note that the fixed logic routine 96 may be of the same type of fixed logic routines 29 and 52 performed by the programmed dedicated processors 28 and 51 of the previous figures.

Once the dedicated fabric 94 has been programmed to perform the fixed logic routine 96, it subsequently will receive the indication of the custom operational code from the fixed logic processor 16. Upon receiving the indication, the dedicated fabric performs the fixed logic routine 96 and provides processed data 34 back to the fixed logic processor 16. Having performed the fixed logic routine, the dedicated fabric 94 may stay configured to perform the fixed logic routine 96 or be reset to a default configuration.

The fixed logic processor 16 may provide various programming instructions 92 to the configuration control module of the dedicated fabric 94 causing it to be configured to perform a variety of fixed logic routines. The programming instructions for programming the dedicated fabric 94 to perform a fixed logic routine 96, which in turn trigger the loading of different configuration data, may be included in the memory blocks 18 through 24 and/or in external memory 26.

Figure 7:
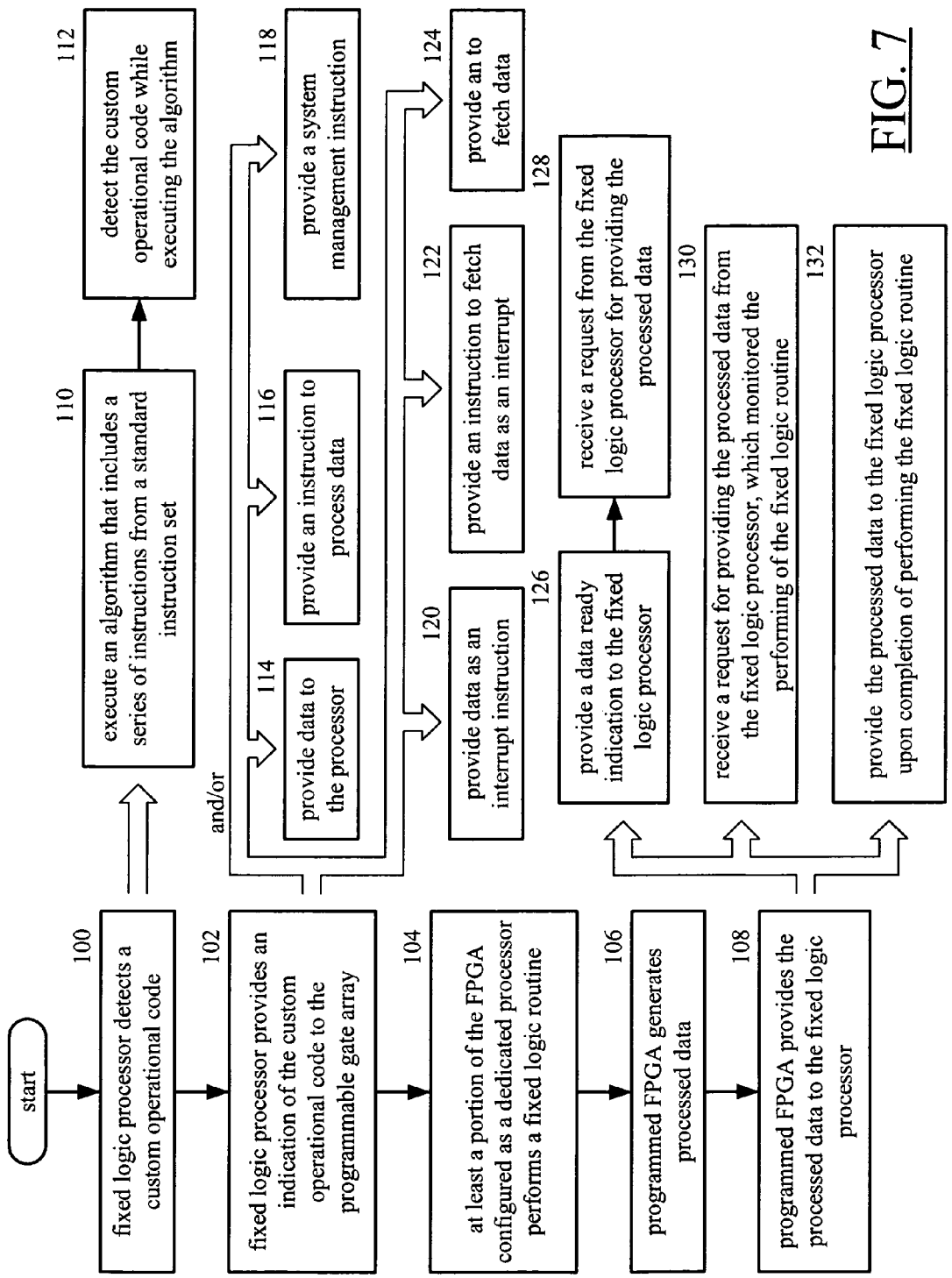
FIG. 7 illustrates a logic flow diagram of a method for processing data within a programmable gate array in accordance with the present invention.

FIG. 7 illustrates a logic diagram of a method for processing data within a programmable gate array. The process begins at Step 100 where the fixed logic processor detects a custom operational code. This is further described with reference to Steps 110 through 112. At Step 110, the fixed logic processor is executing an algorithm that includes a series of instructions from a standard instruction set. For example, if the processor is a power PC processor, the instructions comprising the algorithm will be from the standard instruction set for a power PC microprocessor. The processing then continues to Step 112 where the fixed logic processor detects the custom operational code while executing the algorithm.

Return to the main flow, the processing continues at Step 102 where the fixed logic processor provides an indication of the custom operational code to the programmable gate array. The indication may be provided in a variety of ways as shown at Steps 114 through 124. At Step 114, the indication may include the data that the dedicated processor of the programmable gate array is to perform its function upon. As such, when the dedicated processor receives the data it executes the function and returns the resulting data.

At Step 116, the indication may be provided as an instruction to process data. Accordingly, the instruction would include either the data to be processed and/or the locations within the logical memory where the data should be retrieved for processing.

At Step 118, the indication may be to perform a system management function for the fixed logic processor. Such system management instructions include, but are not limited to, timing issues, maintenance issues, operating system kernel algorithms, et cetera associated with the fixed logic processor.

The indication may also be provided as shown at Step 120 where the data is provided as part of an interrupt instruction. In this instance, the fixed logic processor pauses processing of the algorithm until it receives a response from the dedicated processor of the programmable gate array.

At Step 122, the indication may be provided as an interrupt instruction where the instruction further tells the dedicated processor where to fetch the data.

At Step 124, the indication may be provided as merely an instruction to fetch data and upon fetching the data perform the data and return the processed data to the fixed logic processor.

Returning to the main flow, at Step 104, at least a portion of the programmable gate array that is configured as a dedicated processor performs the corresponding fixed logic routine. Note that the programmable gate array that is configured as a dedicated processor may be pre-configured at the initialization of the programmable gate array to perform the fixed logic routine. The processing then continues at Step 106 where the programmed field programmable gate array generates the processed data. The processing then continues to Step 108 where the programmed FPGA provides the processed data to the fixed logic processor. This may be done in a variety of ways as shown in Steps 126 through 132.

At Step 126, the programmed FPGA may provide a data ready indication to the fixed logic processor. The processing then proceeds to Step 128 where the programmed FPGA receives a request from the fixed logic processor to provide the processed data to it.

As an alternative, at Step 130, the programmed FPGA may receive a request for providing the processed data from the fixed logic processor wherein the fixed logic processor is monitoring the performance of the fixed logic routine by the programmed FPGA.

As yet a further alternative, Step 132 shows that the programmed FPGA may provide the processed data to the fixed logic processor upon completion of performing the fixed logic routine.

FIG. 8 illustrates a logic diagram of another method for processing data within a programmable gate array. The processing begins at Step 140 where the fixed logic processor detects a custom configuration code. The processing then proceeds to Step 142 where the fixed logic processor provides an indication of the custom configuration code to the FPGA and in particular to a configuration control or management module. This may be done in a variety of ways as shown in Steps 152 through 156.

At Step 152, the indication is provided such that at least a portion of the programmable gate array is configured to perform a default fixed logic routine. At Step 154, the fixed logic processor provides an indication that identifies one of a plurality of configurations that the programmable gate array is to configure to perform. At Step 156, the fixed logic processor provides the configuration instructions to the FPGA such that the FPGA is configured to perform a fixed logic routine.

Returning to the main flow at Step 144, at least a portion of the FPGA is configured as a processor to perform a fixed logic routine. The process then proceeds to Step 146 where the fixed logic processor detects a custom operational code. The processing then proceeds to Step 148 where the fixed logic processor provides an indication of the custom operational code to the FPGA. The processing then proceeds to Step 150 where the FPGA performs the fixed logic routine upon receiving the indication.

The preceding discussion has presented a method and apparatus for processing data within a programmable gate array. By utilizing at least a portion of the programmable gate array to perform a fixed logic routine for an embedded logic processor, the FPGA offers greater versatility and flexibility for end users while enhancing the performance of the embedded fixed logic processor. As one of average skill in the art will appreciate, other embodiments may be derived from the teaching of the present invention without deviating from the scope of the claims.

What is claimed is:

1. A system, comprising:
   a logic circuit in an integrated circuit device, wherein the logic circuit comprises:
   a logic fabric that includes a plurality of configurable logic blocks, switching blocks, and input/output blocks, wherein the logic fabric is configured according to configuration data provided to the integrated circuit device and at least a portion of the logic fabric is configured as a first configured processor to perform a first fixed logic function according to the configuration data;
   a fixed logic processor embedded within the logic fabric, the fixed logic processor performing instructions comprising operational code including custom operational code requiring the first fixed logic function, wherein the logic fabric is configured as the first configured processor to perform the first fixed logic function prior to the fixed logic processor performing instructions including the custom operational code requiring the first fixed logic function;
   a first auxiliary processing interface comprising programmable interconnections that couples the first configured processor to perform the first fixed logic function to the fixed logic processor, wherein the fixed logic processor and the first configured processor communicate after detecting the custom operational code requiring the first fixed logic function, wherein a signal indicating the availability of the first configured processor is provided to the fixed logic processor by way of the first auxiliary processing interface;
   a second fixed logic processor embedded within the logic fabric and coupled to the first configured processor, the second fixed logic processor performing instructions comprising operational code; and
   a second auxiliary processing interface comprising programmable interconnections that couples the second fixed logic processor to the first configured processor to perform the first fixed logic function, wherein the second fixed logic processor and the first configured processor communicate after detecting the custom operational code, wherein a signal indicating the availability of the first configured processor is provided to the second fixed logic processor by way of the second auxiliary processing interface, and the first configured processor remains configured to enable both the fixed logic processor and the second fixed logic processor to access the first configured processor to perform the first fixed logic function; and an external memory coupled to the integrated circuit device, the external memory storing the configuration data to configure the logic fabric as the first configured processor to perform the first fixed logic function.

2. The system of claim 1, wherein:

in the logic circuit a second portion of the logic fabric is configured as a second configured processor to perform a second fixed logic function; and the logic circuit further comprises a third auxiliary processing interface that couples the second configured processor to perform the second fixed logic function to the fixed logic processor.

3. The system of claim 1 further comprising:

wherein at least a portion of the input/output blocks of the logic fabric of the logic circuit is coupled to the external memory.

4. A field programmable gate array comprises:

logic fabric that includes a plurality of configurable logic blocks, switching blocks, and input/output blocks, wherein the logic fabric is configured according to configuration data provided to the field programmable gate array from a memory external to the field programmable gate array and at least a portion of the logic fabric is configured as a processor to perform a fixed logic function according to the configuration data;

a fixed logic processor embedded within the logic fabric, the fixed logic processor performing instructions comprising operational code including custom operational code requiring the fixed logic function, wherein the portion of the logic fabric is configured as a processor to perform the fixed logic function prior to the fixed logic processor performing instructions including the custom operational code requiring the fixed logic function;

an auxiliary processing interface comprising programmable interconnections that couples the portion of the logic fabric configured as a processor to perform the fixed logic function to the fixed logic processor, wherein the fixed logic processor and the portion of the logic fabric configured as a processor to perform the fixed logic function communicate after detecting the custom operational code, wherein a signal indicating the availability of the portion of the logic fabric configured as a processor to perform the fixed logic function is provided to the fixed logic processor by way of the auxiliary processing interface;

a second fixed logic processor embedded with the logic fabric and coupled to the portion of the logic fabric configured as a processor to perform the fixed logic function, the second fixed logic processor performing instructions comprising operational code; and a second auxiliary processing interface comprising programmable interconnections that couples the second fixed logic processor to the portion of the logic fabric configured as a processor to perform the fixed logic function, wherein the second fixed logic processor and the portion of the logic fabric configured as a processor to perform the fixed logic function communicate after detecting the custom operational code, wherein a signal indicating the availability of the portion of the logic fabric configured as a processor to perform the fixed logic function is provided to the second fixed logic processor by way of the second auxiliary processing interface, and the portion of the logic fabric configured as a processor to perform the fixed logic function remains configured to enable both the fixed logic processor and the second fixed logic processor to access the portion of the logic fabric configured as a processor to perform the fixed logic function.

5. The field programmable gate array of claim 4 further comprises, wherein a second portion of the logic fabric is configured as a second processor to perform a second fixed logic function:

a third auxiliary processing interface that couples the second processor to perform the second fixed logic function to the fixed logic processor.

* * * * *